United States Patent [19]

Bucher et al.

[11] Patent Number: 4,645,243
[45] Date of Patent: Feb. 24, 1987

[54] INSULATED IRON PIPE JOINT

[75] Inventors: Claude Bucher; Andre Lagabe, both of Pont-a-Mousson, France

[73] Assignee: Pont-a-Mousson S.A., Nancy, France

[21] Appl. No.: 857,018

[22] Filed: Apr. 29, 1986

[30] Foreign Application Priority Data

May 3, 1985 [FR] France .................................. 8506898

[51] Int. Cl.[4] ............................................. F16L 11/12
[52] U.S. Cl. ...................................... 285/47; 285/138; 285/236
[58] Field of Search ................... 285/47, 54, 138, 235, 285/236, 237, 233

[56] References Cited

U.S. PATENT DOCUMENTS

| | | | |
|---|---|---|---|
| 3,492,029 | 1/1970 | French et al. | 285/138 X |
| 3,563,572 | 2/1971 | French | 285/47 |
| 3,645,564 | 2/1972 | Corriston | 285/47 |
| 4,219,225 | 8/1980 | Sigmund | 285/47 |

FOREIGN PATENT DOCUMENTS 2445925 8/1980 France ................................. 285/47

Primary Examiner—Dave W. Arola
Attorney, Agent, or Firm—Sughrue, Mion, Zinn, Macpeak & Seas

[57] ABSTRACT

A sealed joint for connecting cast iron hot water pipes includes a gasket G disposed between a spigot 5 and a socket 6 of two pipes 4, a spacer 1 between the socket end and an outer jacket 8 surrounding a layer of insulation 7, a sealing ring 2, and a clamp 3 to fasten a skirt of the ring around the outer surface of the jacket.

8 Claims, 5 Drawing Figures

INSULATED IRON PIPE JOINT

BACKGROUND OF THE INVENTION

The invention concerns a joint for sealing a pipeline against external fluids, particularly for joining two iron pipes having spigot and socket ends. The invention is applied to hot water pipes covered over most of their length by a layer of foam insulation contained within a protective outer jacket that is impermeable to fluids. The socket and spigot ends of each pipe do not have this outer covering.

French Pat. No. 2,445,925 describes a sealed joint for insulated pipes of this type, using only currently available parts and allowing for a slight angular deviation. This joint includes a rigid outer sleeve made of asbestos cement. The relatively long protrusion of this sleeve with respect to the outer protective covering of the insulating material can be disadvantageous if there is friction in the joint or if the pipes are assembled on the ground. In addition, the rigid outer sleeve that covers the two ends of the exterior casings of the assembled composite pipes requires the installation of washers between the sleeves and the outer casings to protect the insulating layer from external humidity.

U.S. Pat. No. 3,563,572 describes a leaktight and composite assembly of insulated telescoping pipes made of metal and encased in a rigid outer tubing surrounding a layer of insulation. In this assembly a rigid inner locking sleeve, made of insulating material covered with an elastic sealer, joins the two composite pipes without any protrusion over the outer jacket. However, in addition to the fact that such a solution is not applicable to interlocking iron pipes, it does not allow for any angular deviation between the composite pipes because of the presence of the rigid locking sleeve, which must rest on the transverse annular surfaces of the insulating layer. Any angular deviation of the rigid locking sleeve with respect to the insulation would interfere with this transverse support, thereby risking a loss of the seal that protects the layer of insulation from outside moisture. With a small angular deviation, this risk is all the greater because no radial clamping or banding can be used to hold the rigid inner locking sleeve against the rigid outer tubing covering the layer of insulation.

SUMMARY OF THE INVENTION

Applicants thus set out to create a sealed joint between two interlocking spigot and socket pipes covered with insulation and intended for carrying hot water, with the seal preventing any penetration of fluids from outside the conduit into the insulation but allowing for the thermal expansion of the outer insulating casing and of the iron pipe, as well as for some angular deviation and eccentricity between any two connected pipes with a minimum of heat loss at the joint and without any substantial overlap of the outer tubular jackets.

The present invention implements this object by providing a joint, sealed against outside fluids, between two insulated composite pipes each comprising an iron pipe with spigot and socket ends that can be assembled telescopically on either side of a gasket that is subject to the pressure of the fluid being carried in the pipes. Each pipe is insulated by a layer of material that covers the greater part of each pipe, with the exception of the spigot end and the flared end of the socket. The layer of insulation is in turn covered with an impermeable protective outer jacket. Each end of the layer of insulation is sealed by an elastomer ring that effectively closes the annular space between the iron pipe and the protective jacket. The sealed joint is characterized in that one of the sealing rings filling the annular space between the pipe and its outer protective jacket at one end of the insulating layer of each of the composite pipes comprises an anchoring heel that abuts the outer surface of the socket and is radially compressed between the socket and the protective jacket. This anchoring heel extends longitudinally in the form of a seal element that is applied against the socket flush with the outer tubular jacket. Lastly, the seal element extends longitudinally in the form of an overlapping skirt that is clamped elastically over the end of the outer tubular jacket of the joining composite pipe.

DETAILED DESCRIPTION OF THE PREFERRED EMBODIMENTS

Figure 2:
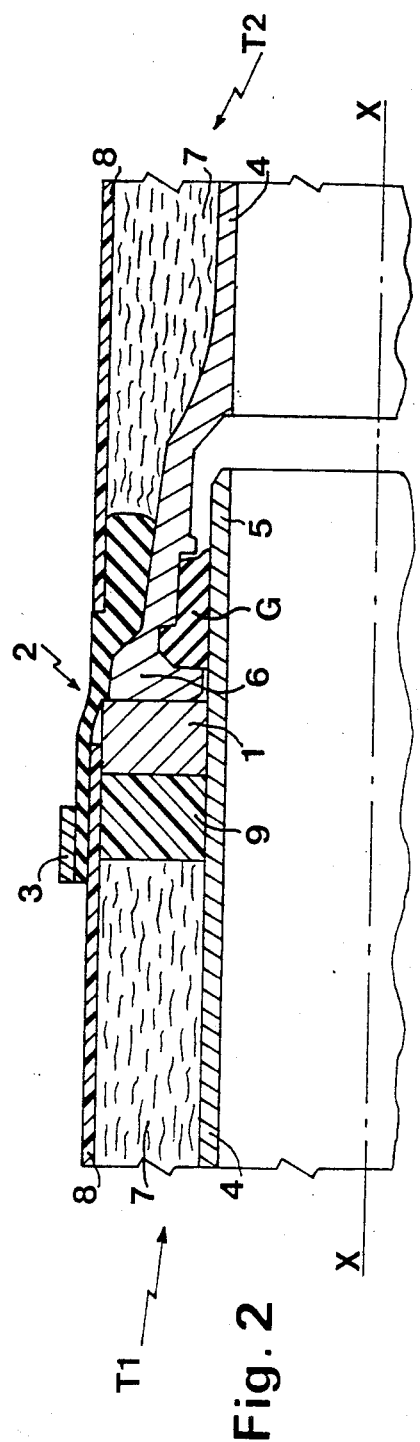
FIG. 2 is a partial longitudinal section showing the sealed joint of the invention.

FIG. 2 shows a sealed joint according to the invention between composite insulated pipes T1 and T2 with axis XX, consisting of iron pipes 4 having a male spigot end 5 and a female socket 6. The joint comprises (i) a gasket G, compressed radially between the spigot end 5 and socket 6 of two pipes 4 and having a heel that anchors it within the socket, (ii) a spacer 1 between each pipe and its outer jacket or cladding, (iii) an elastomer sealing ring 2, which may have a hardness of 60 to 70 degrees Shore, that forms a sealed joint between the outer jackets of the insulating layers that cover the pipes, and (iv) a clamping band 3 that holds the ring 2 against the outer jacket.

Figure 1:
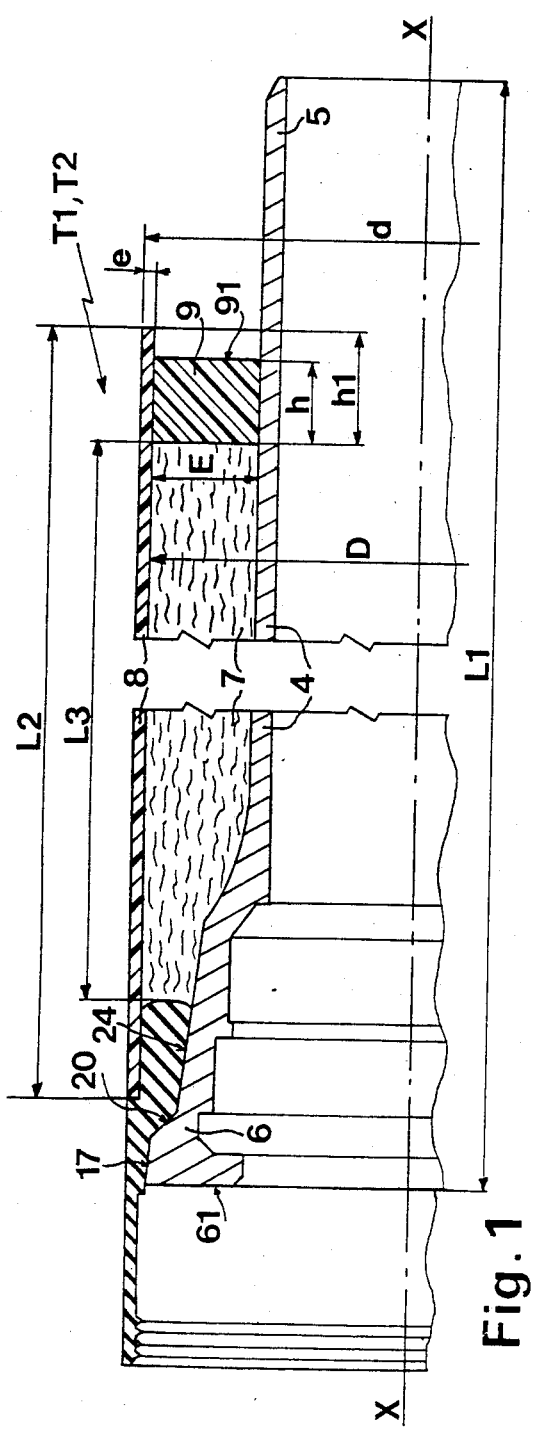
FIG. 1 is a partial longitudinal section of an insulated pipe equipped with the sealing ring of the invention.

As shown more specifically in FIG. 1, each section of insulated pipe T1, T2 consists of a cast iron pipe 4 with a spigot end 5 and socket 6 designed to carry hot water or a similar fluid at temperatures of up to 130° C. The pipe 4 is covered with an outer layer 7 of insulation with external diameter D, such as polyurethane foam, which is in turn contained within a fluid impermeable protective outer jacket 8 formed, for example, from high density polyethylene. As shown in FIG. 2, protective jacket 8 and insulating layer 7 terminate near the ends of the pipe 4, without overlapping the ends. The length L2 of jacket 8 is less than the length L1 of each iron pipe, but is greater than the length L3 of insulating layer 7. The jacket 8 overlaps a sealing ring 9 of length h, set between the pipe and the jacket on the spigot end 5 of the pipe. The axially outer edge of insulating layer 7 at the spigot end of each pipe is thus contained by an elastomer ring 9 of outer diameter D and radial thickness E corresponding to the radial thickness of the layer of insulating material. The ring 9 has a flat end surface 91, and its axial length h is less than the longitudinal distance h1 by which jacket 8 overlaps the layer of insulation.

Figure 3:
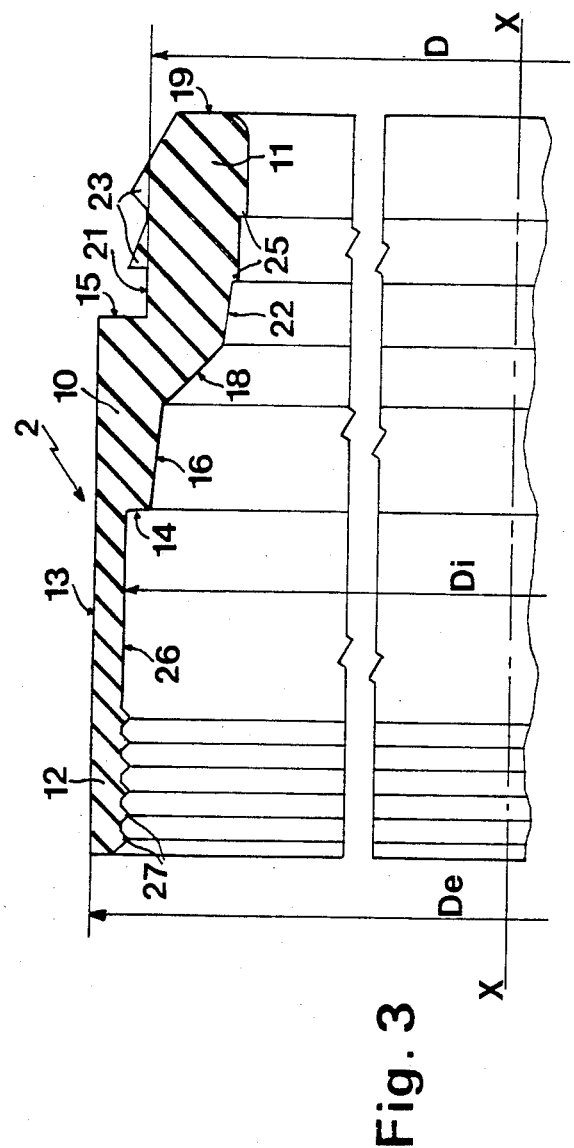
FIG. 3 is an enlarged partial section of the sealing ring of the invention.

The socket end 6 of each pipe carries a sealing ring 2 set between the socket and the jacket 8 at one end of the insulating layer. As seen more clearly in FIG. 3, the elastomer sealing ring 2 with axis XX is elongated in its overall shape and consists of a body 10 with a trapezoidal midsection that extends longitudinally and integrally into a anchoring heel 11 on one end and into an overlapping skirt 12 on the other end. The body 10 is defined by an outer cylindrical surface 13 of diameter De, two flat surfaces or shoulders 14 and 15 perpendicular to axis XX, and an inner surface 16 that may be cylindrical or slightly conical and whose sectional profile corresponds to that of the outer surface 17 of the flange end of the socket. The diameter De of surface 13 is greater than or equal to the outer diameter of jacket 8, and the radial height of surface 15 is greater than or equal to the thickness e of the jacket.

An anchoring heel 11 extends from inner surface 16 of body 10, and is longitudinally defined by a conical inner surface 18 and an end surface 19 that may be curved or straight when viewed in section. The profile of surface 18 corresponds to that of flared outer surface 20 of socket 6. The anchoring heel is further defined radially by an outer surface 21 and an inner surface 22. The outer surface 21 is cylindrical, and has one or more protruding triangular lips or teeth 23. The inner surface 2 is generally conical in profile, corresponding to the flared outer surface 24 of the socket, and has stepped triangular protrusions 25. The outer lips 23 and the protrusions 25 have one surface perpendicular to axis XX, preferably on the side facing body 10. The inner sectional profile of body 10 and anchoring heel 11 thus corresponds to the flared, tulip-shaped outer profile of socket 6.

Outer surface 13 of body 10 extends axially away from anchoring heel 11 to form the outer surface of overlapping skirt 12, which is defined within by cylindrical surface 26 terminating at shoulder 14. At its outermost end the inner surface 26 has a plurality of triangular protrusions 27. The internal diameter Di of skirt 12 is less than the external diameter d of jacket 8.

In summary (FIG. 1), in a composite pipe T1 or T2 according to the invention, at rest and prior to assembly, the thick layer of insulation 7 does not cover the entirety of iron pipe 4 but rather only a part of socket 6 and none of spigot 5. Outer protective jacket 8 completely covers the insulating layer 7 and overlaps it longitudinally. At one end the insulating layer is contained by a blocking ring 9, and at the other end by the anchoring heel 11 of sealing ring 2 abutting socket 6. Skirt 12 extends well beyond flange 17 of the socket.

During assembly a sealing ring 2 is placed against socket 6 with its inner surfaces 16, 18, and 22 in contact with the corresponding outer surfaces 17, 20, and 24 of the socket. After blocking ring 9 has been set into position, the inner surface of jacket 8 is pressed against the outer surface 21 of anchoring heel 11 and against the outer cylindrical surface of blocking ring 9, such that one end of the jacket is in contact with transverse surface 15 of the sealing ring. The outer lips 23 and inner protrusions 25 of the heel are thus radially compressed against the inner surface of the jacket and the outer surface of the socket, which forms a sealed annular space to receive the insulating layer 7. It also forms an effective check against the possibility of the anchoring heel 11 being pulled out of the composite pipe by virtue of the compressed perpendicular protrusions 25 and lips 23. Next, through a hole made in the protective jacket 8, the space between the jacket and the iron pipe 4 is filled with a heat-insulating material to form layer 7. The hole is then sealed. A composite insulated pipe T1 or T2 is then ready for delivery to the work site.

Figure 4:
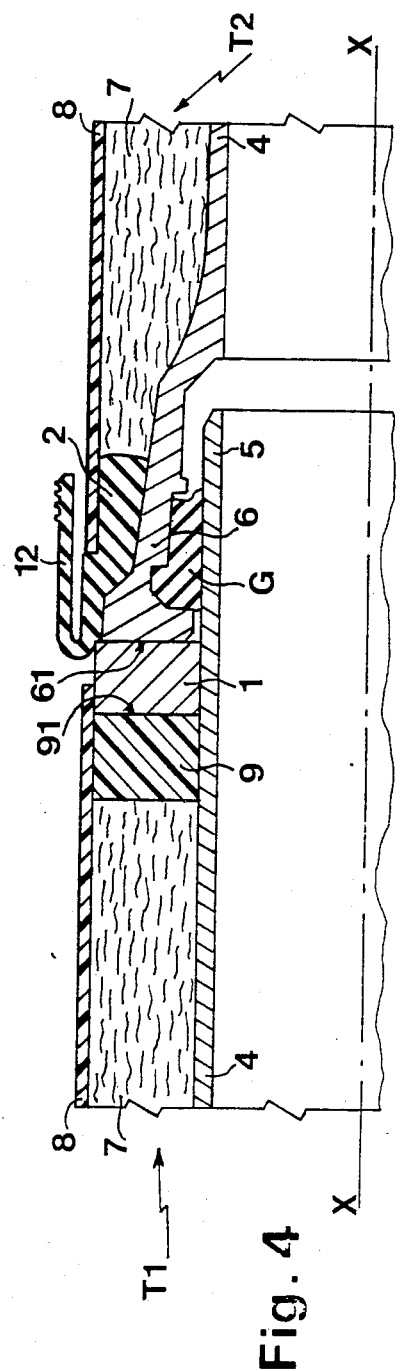
FIG. 4 is a partial longitudinal section illustrating the assembly of the joint of the invention.

On location a spacer 1 consisting of two half-rings or a complete ring (which may or may not be slotted) is placed over the spigot end 5 against surface 91 of ring 9. The spacer is made of a heat-insulating material such as a nitrile or neoprene foam, and has approximately the same thickness as the insulating layer 7. Skirt 12 is rolled or folded back over the jacket 8 of pipe T2 as shown in FIG. 4.

Pipe T1 is then inserted into pipe T2, after gasket G has been placed in its seat inside socket 6. Spigot end 5 of pipe T1 enters the socket pipe T2, and stops when the exposed lateral surface of spacer 1 comes into contact with edge 61 of the socket. Pipes T1 and T2 are then in place, and skirt 12 can be unfolded so that its inner surface 26 is applied over the outer surface of jacket 8 of pipe T1, which is thereby covered. Mastic may be applied between these surfaces. Because the diameter of inner surface 26 is less than the outer diameter of the jacket, the skirt naturally tends to squeeze the jacket, compressing protrusions 27. To complete the process of securing the skirt on the jacket, a clamping band 3 is placed around the end of the skirt overlying the protrusions 27. The clamping band may be a rubber band, a worm screw type of hose clamp, etc.

In operation, a pipeline formed by a number of composite pipes T1, T2 assembled as described above is used to carry hot water or a similar fluid at temperatures of up to 130° C. This causes a longitudinal expansion of each insulating layer 7, jacket 8, and pipe 4. Such expansion in turn axially compresses the spacers 1 between the end rings 9 and the rim edges 61 of the socket. Inversely, when hot water ceases to flow through the pipeline or when it is emptied, the insulating layers, jackets, and pipes contract longitudinally and the spacers 1, no longer subjected to axial compression, resume their initial dimensions while remaining in contact with the edges of the sockets and the end rings.

Thus, by virtue of the spacer 1, the space between surface 91 of end ring 9 and rim edge 61 of socket 6 is still filled with an insulator, which prevents condensation within such space and maintains thermal continuity between the joined pipes while simultaneously allowing for the expansion of the insulating layer and the jacket when hot water is flowing through the pipeline.

In addition, with external fluids sealed out of the pipeline through radial contact between sealing ring 2 and the longitudinal conical surfaces 17, 20, and 24 of pipes T1 and T2, instead of flat surfaces perpendicular to axis XX, the inner surfaces 16, 18, and 22 of the sealing ring can be held fast radially against the corresponding outer surfaces of the socket. This contrasts with what happens when the seal is formed through simple contact or axial clamping of surfaces perpendicular to axis XX, without benefit of any radial hold.

Figure 5:
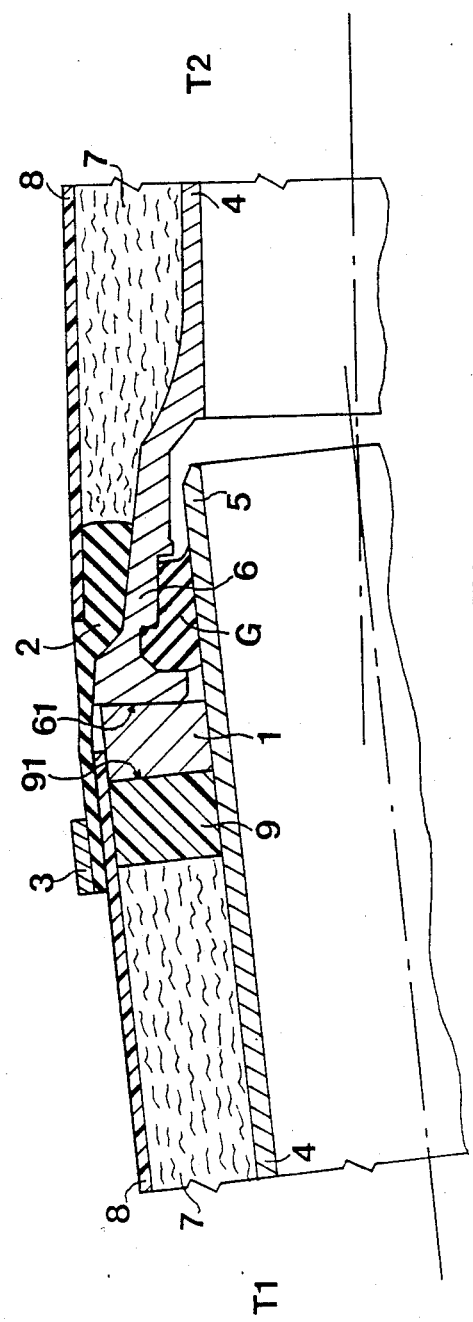
FIG. 5 is a longitudinal section of the sealed joint of the invention showing two pipes joined with maximum eccentricity and maximum angular deviation.

Furthermore, external fluids are sealed out of the pipeline by a single elastomer sealing ring 2, the body 10 of which is in no way externally flanged or covered with an outer jacketing such as 8, and which is therefore left free to serve as a sort of flexible hinge. This enables an angular deviation of several degrees between joined pipes T1 and T2 and also permits a maximum degree of eccentricity between the pipes as shown in FIG. 5. Such deviation or eccentricity is accommodated by body 10 of ring 2, without requiring any modification of the sealed assembly between anchoring heel 11 and socket 6 and jacket 8, or between overlapping skirt 12 and jacket 8.

With spacer 1 playing the role of an axial block between ring 9 and the rim edge of the socket, pipe T1 can penetrate axially only so far into pipe T2, eliminating the need to bring the end of outer jacket 8 into contact with ring 2 and the accompanying danger of crumpling or damaging it through axial compression.

Due to the seal formed between surface 21 of body 11 and the inner surface of jacket 8, and between surface 26 of skirt 12 and the outer surface of the jacket, no moisture from outside the pipeline can come into contact with the spacer ring and therefore cannot creep around its edges into the insulating layer.

In a variant spacer ring 1 may be eliminated, in which case the axial penetration of spigot 5 into socket 6 across gasket G is otherwise controlled, e.g., by placing a mark on spigot 5.

Finally, the fact that sealing ring 2 is assembled onto pipes T1 and T2 in the plant makes it possible for the pipes to be delivered to the site already sealed against outside fluids, thus protecting insulation 7. The sealed connection between two pipes T1, T2 thus requires nothing further than the possible installation of spacer ring 1.

What is claimed is:

1. A joint for sealing external fluids out of two composite insulated pipes (T1, T2) each comprising a section of iron pipe (4) having a spigot (5) and a flared socket (6) at opposite ends, said pipes being assembled telescopically around a gasket (G) which sealingly engages a spigot of one pipe and a flared socket of another pipe and is subjected to internal pressure of a fluid transported in the pipes, with each iron pipe being insulated with a layer of heat-insulating material (7) covering the greater part of the length of each section of pipe (4) with the exception of the spigot and the flared socket, and with the insulating layer being in turn covered with an impermeable, tubular outer protective jacket (8), and with the insulating layer being closed at opposite ends by respective elastomer rings (9, 2) sealing an annular space between the iron pipe and the jacket, said joint being characterized by: one (2) of the sealing rings comprising an anchoring heel (11) resting on an outer surface (17, 20, 24) of the socket and being radially compressed between the socket and the jacket, a seal element (10) constituting a longitudinal extension of said anchoring heel and applied against the socket flush with the outer tubular jacket, and an overlapping skirt (12) constituting a longitudinal extension of the seal element and applied elastically and compressively around an end of an outer tubular protective jacket of an adjoining composite pipe.

2. The joint of claim 1, wherein the longitudinal extension of said seal element comprises an outer cylindrical surface (13) flush with the outer surface of the outer tubular jacket, and an outer shoulder (15) having a radial height corresponding to the thickness of the jacket, an edge of the jacket abutting said shoulder and said shoulder linking the outer cylindrical surface of the seal element with an outer cylindrical surface (21) of the anchoring heel (11), the seal element and the anchoring heel defining adjoining inner conical surfaces (16, 18, 22) corresponding to outer conical surfaces (17, 20, 24) of the socket and being held thereagainst by radial compression.

3. The joint of claim 2, wherein the outer cylindrical surface (21) of the anchoring heel comprises protruding triangular lips (23), and an inner conical surface (22) of said anchoring heel comprises protruding triangular steps (25), surfaces of which facing the seal element lying perpendicular to an axis (XX) of the sealing ring (2).

4. The joint of claim 1, wherein an inner surface (26) of the overlapping skirt comprises, near an end thereof, annular triangular protrusions (27) adapted to be compressed against the outer surface of the jacket.

5. The joint of claim 3, wherein an inner surface (26) of the overlapping skirt comprises, near an end thereof, annular triangular protrusions (27) adapted to be compressed against the outer surface of the jacket.

6. The joint of claim 4, wherein the skirt is fastened around the jacket by clamping means (3).

7. The joint of claim 1, wherein, in the presence of any angular deviation between adjoining composite pipes, the seal element (10) functions as a flexible hinge.

8. The joint of claim 1, wherein an annular spacer ring (1) made of heat-insulating material is disposed between a sealing ring (9) mounted on the spigot end of one pipe and a rim edge (61) of the socket of an adjoining pipe.

* * * * *